United States Patent Office 3,709,887
Patented Jan. 9, 1973

3,709,887
1-SUBSTITUTED - 5,6 - DIHYDRO - 7H-PYRIDO
(3,2,1-ij)QUINAZOLIN-3(3H)-ONES AND THEIR
PREPARATION
George A. Cooke, Denville, and William J. Houlihan,
Mountain Lakes, N.J., assignors to Sandoz-Wander,
Inc., Hanover, N.J.
No Drawing. Continuation-in-part of abandoned application Ser. No. 13,817, Feb. 24, 1970. This application Dec. 8, 1971, Ser. No. 206,156
Int. Cl. C07d 51/48
U.S. Cl. 260—251 A                    15 Claims

ABSTRACT OF THE DISCLOSURE

Disclosed are compounds of the general class of 1-aryl-5,6-dihydro - 7H - pyrido[3,2,1-ij]quinazolin-3(3H)-ones including compounds which are 1-aryl-5,6-dihydro-7H-pyrido[3,2,1-ij]quinazolin-3-(3H)-ones, and compounds which are 1-aryl-1,2,5,6-tetrahydro-7H-pyrido[3,2,1-ij] quinazolin-3(3H)-ones. The 5,6-dihydro compounds are prepared by oxidation of the corresponding 1,2,5,6-tetrahydro compounds and the latter are prepared by reaction of a 2,3-dihydro-1(4H)-quinoline-carboxamide with an appropriately substituted or unsubstituted aromatic aldehyde. The pyrido[3,2,1-ij]quinazolin-3(3H)-ones have pharmacological activity in animals and are useful as sedatives, analgesics or anti-inflammatory agents. The quinoline-carboxamide are useful as sedatives and are prepared by reacting the corresponding quinoline with isocyanic acid.

This application is a continuation-in-part of application Ser. No. 13,817, filed Feb. 24, 1970, now abandoned.

The present invention relates to tricyclic compounds, and more particularly to compounds which are 1-substituted-5,6-dihydro-7H-pyrido[3,2,1-ij]quinazolin - 3(3H)-ones including compounds which are 1-aryl-1,2,5,6-tetrahydro-7H-pyrido[3,2,1-ij]quinazolin-3(3H)-ones. The invention also relates to preparation of such compounds from quinoline-carboxamide intermediates and to methods and compositions utilizing the pharmacological activities of said tricyclic and quinoline compounds.

The compounds of the inventions may be represented structurally by the Formulae I and II, as follows:

wherein

R° is hydrogen, halo of atomic weight of from 19 to 80, lower alkyl of 1 to 4 carbon atoms or lower alkoxy of 1 to 4 carbon atoms, $R_1$ is hydrogen or lower alkyl of 1 to 3 carbons (in the 5-, 6- or 7-position, preferably the 5-position), R is from the group of phenyl and substituted phenyl of the formula:

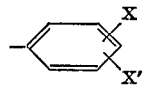

Y is halo of atomic weight of from 19 to 80, lower alkyl of 1 to 4 carbon atoms, lower alkoxy of 1 to 4 carbon atoms or trifluoromethyl, and Y" is hydrogen, halo of atomic weight of from 19 to 80, lower alkyl of 1 to 4 carbon atoms or lower alkoxy of 1 to 4 carbon atoms.

The compounds of Formula I are preferably prepared from compounds II by oxidizing the latter in an organic solvent in a reaction referred to herein as Step A.

The preparation of compounds I from compounds II by the reaction of a Step A may be conveniently carried out in an inert organic solvent at temperatures in the range of 0° C. to 120° C., typically 15° C. to 100° C. The oxidizing agents which may be employed are of known type suitable for converting an organic imino moiety to an amino moiety. Representative of such oxidizing agents are the alkali metal permanganates, such as sodium or potassium permanganate, manganese dioxide and mercuric acetate, preferably potassium permanganate. The solvent may be any of several conventional organic solvents including by way of illustration the lower alkanols, e.g. methanol and ethanol, the aromatic solvents, e.g. benzene and the ethers including the cyclic ethers, e.g. dioxane. The reaction product of Formula I may be isolated from the Step A reaction by working up by established procedures.

The compounds of Formula II are preferably prepared in a Step B reaction by reacting a compound of the Formula III:

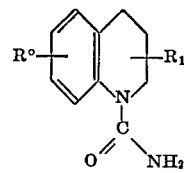

in which R° and $R_1$ are as defined, with a compound of the Formula IV:

R—CHO                    (IV)

in which R is as defined, at elevated temperatures whereby compounds of Formula II are obtained.

The preparation of compounds of Formula II by Step B involving reaction of a compound III with a compound IV is carried out at elevated temperatures in the range of 30° C. to 120° C., preferably 50° C. to 100° C. The reaction is suitably carried out in the presence of an acid as catalyst and dehydrating agent but which is otherwise non-reactive with compounds III and IV, for example, an organic acid such as an arylsulfonic acid or an alkylsulfonic acid such as benzenesulfonic acid, p-toluenesulfonic acid and methanesulfonic acid, preferably methanesulfonic acid. The amount of acid catalyst is desirably controlled at a minor amount not substantially exceeding about one molar equivalent based on the compound III, and is most preferably a minor catalytic amount between 0.005 to 0.5 molar equivalent based on the urea. The conducting of the reaction of Step B under anhydrous or nearly anhydrous conditions is important to obtaining effective results. The reaction is conveniently carried out in an organic solvent which may be any of several conventional organic solvents providing an inert reaction medium, preferably an aromatic solvent such as benzene and the like. Depending upon known factors such as reaction temperature, etc. the reaction may take typically between 1 to 50 hours. The reaction product of Formula II may be isolated from the reaction mixture of Step B by working up by established procedures.

We had postulated that the preparation of compounds II by reaction of compounds III and IV in Step B proceeds through an intermediate of the Formula A:

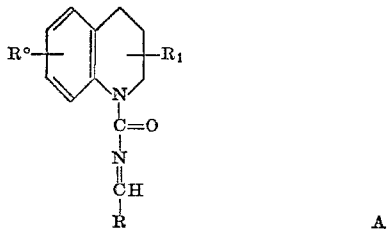

wherein R°, $R_1$ and R are as defined. In our experimentation conducted with reference to the more preferred embodiments of the invention it was evident that an intermediate of Formula A had been formed on merely a transient basis, and that the reaction of Step B may directly produce compounds II in good yields in essentially a single state operation when conducted under the preferred conditions as demonstrated, for example, in Step C of Example 1, hereinafter.

The compounds of Formula III in which each of R° and $R_1$ is hydrogen is known per se and the balance compounds III which are unknown may be prepared from known materials by established procedures.

A preefrred procedure for preparation of compounds III as illustrated hereinafter in Step B of Example 1 involves subjecting in a reaction referred to herein as Step C a compound of the Formula V:

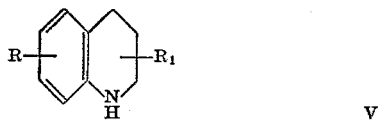

in which R and $R_1$ are as defined, to reaction with isocyanic acid which is provided in a conventional manner by forming in situ from an alkali metal isocyanate and a suitable acid such as a lower aliphatic carboxylic acid, preferably acetic acid. The reaction of Step C may be suitably carried out at temperatures in the range of 10° C. to 50° C. and in an organic solvent medium which may be conveniently a lower aliphatic carboxylic acid such as excess acetic acid.

The compounds of Formula III may also be provided starting with a compound of Formula V in a Step C–1 by subjecting the latter to reaction with nitrourea at temperatures typically in the range of 80° C. to 120° C. in an inert organic solvent of conventional type, preferably a lower alkanol such as ethanol.

The reaction product of Formula III may be isolated from the reaction of Step C and C–1 by working up by conventional procedures.

The compounds of Formula IV and V are either known or can be prepared from known materials by established procedures.

The compounds of Formulae I and III are useful because they exhibit pharmacological activity in animals. In particular, the compounds of Formula I are useful as anti-inflammatory agents as indicated by the carrageenan-induced edema test in rats (10–175 mg./kg. orally). The compounds of Formula I are also useful as analgesic agents as indicated, for example, by the application of pressure to the yeast-inflamed foot of the rat (20–175 mg./kg. orally). The compounds of Formulae I and III are also useful as sedative-hypnotics as indicated by behavior tests in mice and/or a reinduction of hexobarbital anesthesia in mice and/or an inhibition of chemically-induced seizures in mice (30–300 mg./kg. ip.). The preferred sedative-hypnotics of the Formula III are those in which $R_1$ is alkyl, more preefrably those in which $R_1$ being alkyl is located at the 2-position. For such uses, the compounds may be combined with a pharmaceutically acceptable carrier, and such other conventional adjuvants as may be desired, and preferably administered orally in such forms as tablets, capsules, elixirs, suspensions and the like. For the above-mentioned uses, the dosage administered will, of course, vary depending upon known factors such as the particular compound used and the mode of administration. However, in general, the compounds of Formulae I and III provide satisfactory results when administered at a daily dose of from about 1 milligram to about 200 milligrams per kilogram of body weight, preferably given in divided doses 2 to 4 times a day, with daily dosage for large mammals ranging between 60 milligrams to 2000 milligrams and individual doses ranging between 30 to 1000 milligrams.

For the above usages, oral administration of either compounds I or III with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooelate) and preservatives (ethyl-p-hydroxybenzoate). Capsules preferably contain the active ingredients admixed with an inert solid diluent, e.g., calcium carbonate, calcium phosphate and koalin. The prefered pharmaceutical compositions from the standpoint of preparation and ease of administration are solid compositions, particularly solid diluent-filled capsules and tablets.

A representative formulation is a table prepared by conventional tableting techniques and containing the following ingredients:

| Ingredients: | Weight (mg.) |
|---|---|
| 1 - phenyl - 5,6 - dihydro - 9 - methoxy - 7H-pyrido[3,2,1-ij]quinazolin-3(3H)-one | 50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

1-phenyl-5,6-dihydro-9-methoxy-7H-pyrido[3,2,1-ij]
quinazolin-3(3H)-one

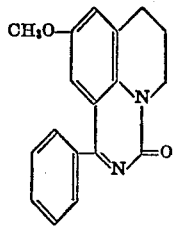

Step A: Preparation of 1,2,3,4-tetrahydro-6-methoxy-quinoline.—To a solution of 100 gms. of 6-methoxy-quinoline in 100 mls. of ethanol is added 10 gms. of Adams' catalyst. The resulting suspension is treated with hydrogen gas at ambient temperature and 60 p.s.i.g. until uptake of hydrogen ceases. The catalyst is removed by vacuum filtration and the filtrate stripped to yield 1,2,3,4-tetrahydro-6-methoxyquinoline, B.P. 101–102° C./0.5 mm.

Step B: Preparation of 2,3-dihydro-6-methoxy-1(4H)-quinolinecarboxamide.—To a solution of 16.3 gms. of 1,2,3,4-tetrahydro-6-methoxyquinoline in 100 mls. of glacial acetic acid at 15° C. is added 10.7 gms. of sodium cyanate in several portions over a period of about 10 minutes. The reaction is stirred during this addition and for one-half hour subsequently. The solution is then diluted with 100 mls. of water and stirred til precipitation is complete (about 1 minute). The precipitate is collected by vacuum filtration, washed repeatedly with water, and dried at reduced pressure at 40° C. to obtain 2,3-dihydro-6-methoxy - 1(4H) - quinolinecarboxamide, M.P. 140–145° C.

Step C: Preparation of 1-phenyl-1,2,5,6-tetrahydro-9-methoxy-7H-pyrido[3,2,1-ij]-quinazolin - 3(3H) - one.—
To a solution of 5 gms. of 2,3-dihydro-6-methoxy-1(4H)-quinolinecarboxamide in 200 mls. of benzene is added 10 gms. of benzaldehyde and 2 mls. of methanesulphonic acid. The reaction mixture is allowed to reflux overnight in an atmosphere of nitrogen and under a water-separator. At the end of this period the reaction is cooled, and washed several times with water. The organic layer is dried and stripped at reduced pressure to give a residue which when triturated with petroleum ether (B.P. 30–60°) and washed with ethyl acetate to provide 1-phenyl-1,2,5,6 - tetrahydro - 9 - methoxy-7H-pyrido[3,2,1-ij]-quinazolin-3(3H)-one, M.P. 225–226° C.

Step D: Preparation of 1 - phenyl-5,6-dihydro-9-methoxy-7H-pyrido[3,2,1-ij]-quinazolin-3(3H) - one.—To a suspension of 5 gms. of 1-phenyl-1,2,5,6-tetrahydro-9-methoxy - 7H - pyrido-[3,2,1-ij]-quinazolin-3(3H)-one in 25 mls. of dioxane is added dropwise with stirring a solution of 0.6 gms. KMnO$_4$ in 25 mls. of water. After this addition is complete, 2 mls. of Formalin solution is added, the reaction mixture is stirred for 5 minutes, and precipitated solids then removed by filtration. The filtrate is concentrated and on cooling bright yellow crystals form. These are collected by filtration and recrystallized from ethyl acetate to obtain 1-phenyl-5,6-dihydro-9-methoxy-7H - pyrido - [3,2,1-ij]-quinazolin-3(3H)-one, M.P. 158–160° C.

EXAMPLE 2

Following the procedures of Example 1 the following compounds of the invention are prepared:

(A) 1-(4-chlorophenyl)-9-methoxy-1,2,5,6-tetrahydro-7H-pyrido[3,2-1-ij]quinazolin-3(3H)-one, M.P. 185–187° C. (crystallized from ethyl acetate)

(B) 1-(4-chlorophenyl)-9-methoxy-5,6-dihydro-7H-pyrido[3,2,1-ij]quinazolin-3(3H)-one, M.P. 164–166° C. (crystallized from ethyl acetate)

(C) 1-(3-methoxyphenyl)-9-methoxy-1,2,5,6-tetrahydro-7H-pyrido[3,2,1-ij]quinazolin-3(3H)-one.

(D) 1-(3-methoxyphenyl)-9-methoxy-5,6-dihydro-7H-pyrido[3,2,1-ij]quinazolin-3(3H)-one.

(E) 1-phenyl-9-chloro-1,2,5,6-tetrahydro-7H-pyrido-[3,2,1-ij]quinazolin-3(3H)-one.

(F) 1-phenyl-9-chloro-5,6-dihydro-7H-pyrido[3,2,1-ij]quinazolin-3(3H)-one.

(G) 1-phenyl-5,9-dimethyl-1,2,5,6-tetrahydro-7H-pyrido-[3,2,1-ij]quinazolin-3(3H)-one.

(H) 1-phenyl-5,9-dimethyl-5,6-dihydro-7H-pyrido[3,2,1-ij]quinazolin-3(3H)-one.

EXAMPLE

Following the procedure of Step B of Example 1 the following compounds are prepared.

(A) 2,3-dihydro-6-chloro-1(4H)-quinoline-carboxamide.

(B) 2,3-dihydro-2,6-dimethyl-1(4H)-quinoline-carboxamide.

(C) 2,3-dihydro-2-methyl-1(4H)-quinoline-carboxamide.

EXAMPLE 4

A representative formulation involving a compound of the Formula III for use in effecting sedation on administration 4 times a day is a capsule prepared by conventional techniques and containing the following:

| Ingredient: | Weight (mg.) |
|---|---|
| 2,3 - dihydro-2,6-dimethyl-1(4H)-quinoline-carboxamide | 60 |
| Lactose | 240 |

What is claimed is:
1. A compound of the formula:

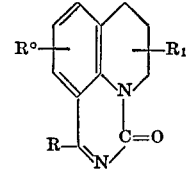

wherein
R° is hydrogen, halo of atomic weight of from 19 to 80, lower alkyl or lower alkoxy,
R$_1$ is hydrogen or lower alkyl,
R is phenyl or substituted phenyl of the formula:

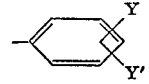

Y is halo or atomic weight of from 19 to 80, lower alkyl, lower alkoxy or trifluoromethyl, and
Y' is hydrogen, halo of atomic weight of from 19 to 80, lower alkyl or lower alkoxy.

2. A compound of claim 1 in which R is phenyl.
3. A compound of claim 2 in which R° is lower alkoxy.
4. The compound of claim 3 in which R° is 9-methoxy and R$_1$ is hydrogen.
5. A compound of claim 1 in which R is substituted phenyl, Y' is hydrogen and Y is halo.
6. The compound of claim 3 in which R° is 9-methoxy and R is 4-chlorophenyl.
7. The compound of claim 2 in which R° is 9-chloro and R$_1$ is hydrogen.
8. A compound of claim 1 in which R$_1$ is lower alkyl.
9. A compound of claim 8 in which R$_1$ is alkyl at the 5-position.
10. A compound of claim 9 in which R$_1$ is methyl and R is phenyl.
11. The compound of claim 10 in which R° is 9-methyl.

12. A compound of the formula:
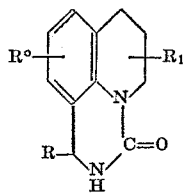
wherein R°, R and $R_1$ are as defined in claim 1.
13. A compound of claim 12 in which $R_1$ is lower alkyl.
14. A compound of claim 13 in which $R_1$ is lower alkyl at the 5-position.
15. A compound of claim 12 in which $R_1$ is hydrogen.
References Cited
UNITED STATES PATENTS
1,122,790  12/1914  Munch _____ 260—251
NICHOLAS S. RIZZO, Primary Examiner
R. V. RUSH, Assistant Examiner
U.S. Cl. X.R.
260—287 R; 424—251, 263